United States Patent [19]
Guthrie et al.

[11] Patent Number: 4,664,517
[45] Date of Patent: May 12, 1987

[54] UNSTABLE CONFOCAL RESONATOR CAVITY ALIGNMENT SYSTEM

[75] Inventors: Richard Guthrie, Wakefield, Mass.; Thomas B. McDonald, III, Palm Beach Gardens; David Anafi, West Palm Beach, both of Fla.

[73] Assignee: United Technologies Corporation, Hartford, Conn.

[21] Appl. No.: 749,605

[22] Filed: Jun. 27, 1985

[51] Int. Cl.⁴ ............... G01B 11/26; H01S 3/08
[52] U.S. Cl. ......................... 356/138; 356/153; 372/107
[58] Field of Search ............ 356/138, 153, 136; 372/9 S, 107, 108

[56] References Cited

U.S. PATENT DOCUMENTS 4,433,418  2/1984  Smith ........................... 372/9 S

FOREIGN PATENT DOCUMENTS 0716481  3/1981  Greece ........................... 372/107

Primary Examiner—R. A. Rosenberger
Assistant Examiner—Crystal D. Cooper
Attorney, Agent, or Firm—Eric W. Petraske

[57] ABSTRACT

An autoalignment system for an unstable laser resonator includes means for measuring the angular position of a convex mirror and adjusting the concave mirror to a new optic axis defined by the convex mirror.

1 Claim, 2 Drawing Figures

UNSTABLE CONFOCAL RESONATOR CAVITY ALIGNMENT SYSTEM

The Government has rights in the invention pursuant to Contract No. 86AJ-RL-70297-OG awarded by the Department of the Army.

DESCRIPTION

1. Technical Field

The field of the invention is that of unstable optical resonators; in particular optical resonators having a confocal pair of convex and concave mirrors.

2. Background Art

It is known in the art that unstable resonators are extremely sensitive to misalignment, and a number of active systems have been devised to compensate and correct for misalignment during operation.

One straightforward approach to solve the problem is to sample the output beam and to adjust the cavity mirrors in order to bring the beam back to its specified position and quality.

DISCLOSURE OF INVENTION

The invention relates to an auto-alignment system for unstable optical resonators having convex and concave mirrors in which an alignment beam tests the cavity alignment without entering the mode volume of the resonator.

A feature of the invention is the use of an alignment beam directed at the backside of a convex mirror together with a second alignment beam directed at the outer portion of a concave mirror. Another feature of the invention is the provision of an alignment that accurately tracks the output beam of the laser, whether the laser is on or off.

BEST MODE FOR CARRYING OUT THE INVENTION

Figure 1:
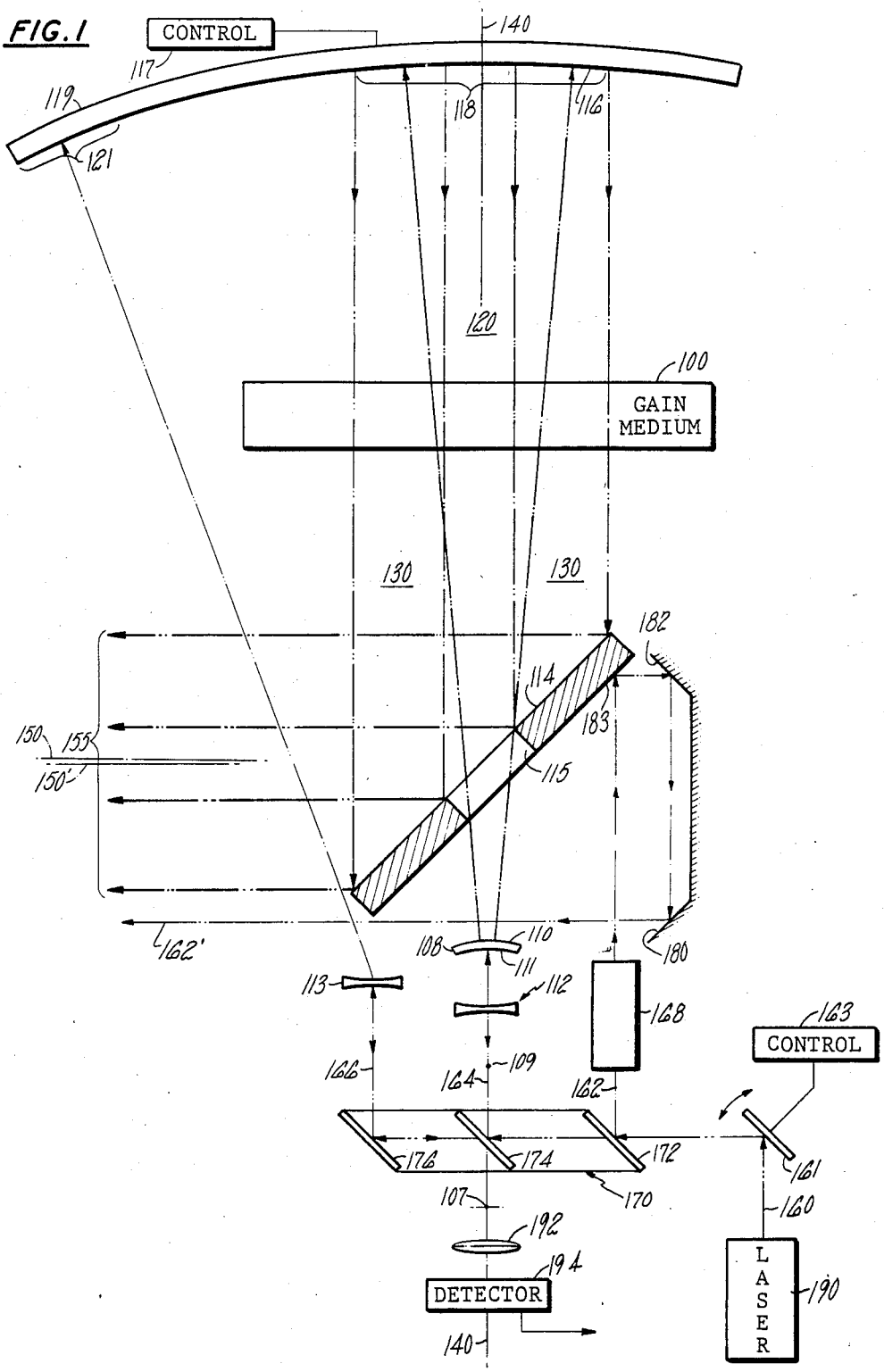
FIG. 1 illustrates, in partially schematic partially pictorial fashion, an embodiment of the invention.

FIG. 1 shows schematically a simplified view of high-power unstable optical cavity that may be an oscillator or an amplifier. The cavity has a central optical axis denoted by the line 140 and is bounded by a concave mirror 119 and a convex mirror 108. The noncollimated portion of the resonator volume is denoted by the area indicated by the numeral 120 and the collimated portion is indicated by the numeral 130. Conventional scraper mirror 114, having aperture 115, deflects an output beam along axis 150. The dimension of the output beam is indicated by the bracket labelled 155. Conventional pumps, support structures and the like have been omitted from the drawing for simplicity. The laser may be illustratively a $CO_2$ laser or any other convenient gain medium (shown schematically as box 100). The drawing is shown as having a simple resonator configuration, but many other equivalent configurations such as those which include one or more turning mirrors may also be included.

It is well known that such unstable resonators are extremely sensitive to misalignment, in which the actual optical axis of the resonator is different from the nominal axis 140 and the actual beam direction is different from the nominal beam direction 150. This invention relates to an improved control system to maintain the resonator in condition to emit a high quality output beam. It should be noted that a control system, according to this invention, does not attempt to maintain the resonator mirrors at their nominal position, but rather responds adaptively to misalignments that occur to maintain high power.

Concave mirror 119 has a front surface 116 that has a center of curvature at point 107 on axis 140. Convex mirror 108 has a front surface 110 having a center of curvature at point 109 and a back surface 111 also having the same center of curvature 109.

The alignment system generates an alignment beam 160 at any convenient wavelength and laser 190 directs it to a controllable turning mirror 161 which is oriented under control of computer 163 as will be described below. Alignment beam 160 passes through triple rhomboid beam splitter 170 which serves to tap off three different alignment beams. The first beam, 162, will be described later. The central beam 164 is deflected by partially reflective surface 174 along axis 140 to form beam 164 which passes initally through point 109 and diverges through negative lens 112 to reflect from back surface 111. If mirror 108 is in perfect alignment, beam 164 will be reflected back through lens 112 and recollimated and back along axis 140 through surface 174 and will be focused by lens 192 on to quadrant detector 194. Lens 192 and detector 194 are aligned along axis 140 so that detector 194 will generate a signal that represents the deviation of the return beam from the nominal beam axis 140. If, for example, mirror 108 has been tilted through vibration, thermal distortion or any other means, the radiation will be reflected at an incorrect angle and a focal spot will be formed on detector 194 resulting in a signal sent to computer 163 to adjust turning mirror 161 to center the return spot on axis 140. Systems could be devised to adjust the position of mirror 108 to center the return beam, but the approach of this system is to leave convex mirror 108 unchanged and to adjust the other elements of the system.

As will be shown below in connection with the discussion of FIG. 2, alignment beam 164 will be deflected at an angle $\theta$ that is related to the difference between the new point, referred to as 109', of the actual center of curvature of mirror 108 and its nominal position, referred to as point 109. Once the adjustment of turning mirror 161 is complete, the system switches to control the concave mirror 119.

Beam 166, being deflected from surface 176, will now have a different angle in response to the new angle of control mirror 161. This second beam 166 is diverged by off-axis lens 113 and strikes mirror 119 to one side of the portion of front surface 116 that is struck by the high power beam and is denoted by bracket 118. Beam 166 strikes front surface 116 at a region (denoted by bracket 121) outside the mode volume of the laser. The alignment beam 166 is reflected back through diverging lens 113 where it is recollimated and is then deflected in turn by surface 176 and 174 through lens 192 and back to detector 194. Conventional shutters or dithering may be used in order to separate the two alignment beam signals. It is not necessary that beam 166 return back to detector 194, although it is simpler. Another detector along the axis of line 166 could also be used. Beam 166 will be focussed at a point off the center of detector 194, of course, because beam 160 has been tilted by turning mirror 161 and the deviation has extended through the path of beam 166. The control system, shown schematically as box 117, will tilt concave mirror 119 in a fashion known to those skilled in the art in order to position the return beam spot of beam 166 at the center of detector 194. In short, control system 117 will deliberately move the correctly aligned mirror 119 to a different position having a different center of curvature 107', that is appropriate for the new axis off mirror 108. When the alignment is finished and the beam spot from return beam 166 is centered on detector 194, mirrors 119 and 108 will have a new axis, referred to as 140', that is along a line between points 107' and 109' and will have retained their confocal alignment to a sufficiently good approximation.

The foregoing discussion has assumed, for clarity of explanation, that mirror 108 has only tilted and has not been displaced and that mirror 119 is to be only tilted. Extension of the principles of the invention to system that displace mirror 119 as well is straight-forward, but would be expensive. It is an advantageous feature of this invention that the large and heavy mirror 119 need not be displaced.

As a result of this control, the cavity will again produce a quality beam, since the misalignment has been corrected, but the new beam will point in a new direction, 150', that is different from the nominal output beam 150. A conventional beam transport system or a beam tracking system may adjust beam 150 to a point at whatever target is desired.

It would be useful, however, to have an alignment beam that travels accurately parallel to the new output beam direction 150'. It is the function of the components in the right-hand portion of the drawing to produce such an alignment output beam, referred to by the numeral 162'. Alignment beam 162 reflects off reflective surface 172, passes through telescope 168, to be described later, and continues on to reflect off point 183 on the backside of mirror 114 through corner cube surfaces 182 and 180 and out along beam direction 162'. The direction of beam 162 will move in response to controllable mirror 161 to reflect any change in the position of mirror 108 and the reflection off the backside of mirror 114 will respond to any misalignment in that mirror, so that beam 162' will track the output beam 150'. It is an advantageous feature of the invention that beam 162 can be generated even with the high power laser turned off, so that any following beam transport system or other device can respond immediately to any changes in the alignment of the main cavity before the main cavity is turned on. Thus, for systems which operate only intermittently, any subsidiary system may maintain itself in alignment with the master system and be correctly aligned at the time the master system is turned on.

Figure 2:
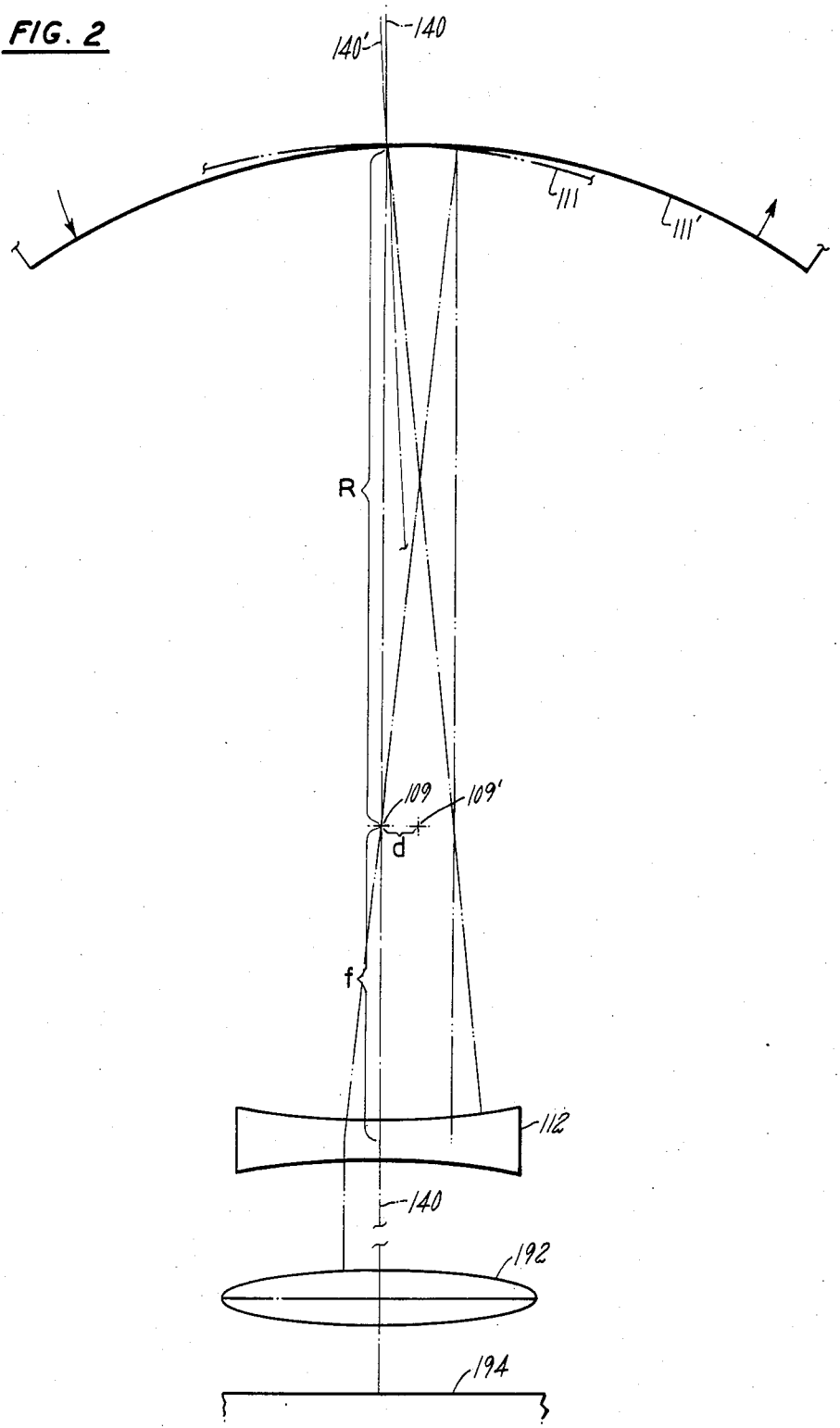
FIG. 2 illustrates a detail from FIG. 1.

Referring now to FIG. 2, there is shown a detail of FIG. 1 showing surface 111 of mirror 108 and a new surface 111' which is illustratively generated by a tilt in mirror 108, the direction of the tilt being indicated by the arrows. A new axis 140' is the central axis of surface 111'. A new center of curvature 109' is shown displaced from the old center of curvature 109. The angle between axes 140 and 140' is d/R where d is the displacement between position 109 and position 109' and R is the distance from the front surface of mirror 119 to position 109. It will readily be apparent to those skilled in the art that the correct entry angle for beam 164' to follow is that given by the angle $\theta$ which has the value $2d/f$ where d is the displacement of the center of curvature 109' from the old center of curvature 109 and f is the focal length of lens 112. Since the return alignment beam 164 must be parallel to the old axis 140, the new entry alignment beam must have an angle with respect to the axis 140 of lens such that a virtual object at position f above lens 112 with displacement $2d$ will be focussed back on axis 140 by lens 192 that demands a collimated beam in order to provide a focus at detector 194.

The same figure can be used in the discussion of mirror 119, except that the beam is displaced towards one side rather than striking at the center.

Once aligned, the new axis 140' will make an angle with the output pointing direction 150' of the new beam that is just a factor of 2 greater in magnitude i.e., a new beam 150' will differ from the nominal beam 150 by twice the angle with which beam 162' would differ from the nominal beam line 162. This deviation is corrected for by telescope 168 which is indicated schematically in the figure as it is a conventional telescope well known to those skilled in the art. This telescope corrects the angular deviation of beam 162 by a factor of one half so that the beam in 162 at the output is accurately parallel to beam in 150' the new output beam of the laser.

We claim:
1. An optical alignment system for controlling the relative orientation of a second mirror with respect to the orientation of a convex cavity surface of a first mirror in a high-power optical cavity comprising:
   an alignment laser for generating an alignment beam;
   a controlled steering mirror for adjusting the direction of propagation of said alignment beam;
   first deflection means for deflecting a first portion of said alignment beam toward a concave rear reference surface of said first mirror and for passing a return alignment beam having a rear reference axis, said concave rear reference surface having a center of curvature in common with said convex cavity surface;
   first deviation measurement means positioned on a nominal axis of said first mirror, for measuring a deviation of said rear first return alignment beam from a nominal position;
   controller means for controlling said steering mirror in response to a signal from said deviation measurement means to adjust said direction of propagation of said alignment beam to drive a reflected alignment beam from said rear reference surface to intersect said nominal axis of said first mirror at said first deviation measurement means, whereby a controlled position of said steering mirror is related to said deviation of said rear reference surface;
   second deflection means for deflecting a second portion of said alignment beam toward a concave active surface of said second mirror and for passing a return portion of said second portion of said alignment beam toward second deviation measurement means;
   second controller means for controlling the position of said second mirror to reflect said return portion of said alignment beam substantially parallel to said rear reference axis, whereby said second mirror is substantially aligned with said first mirror along a new optic axis different from said nominal optic axis.

* * * * *